United States Patent
Do

(10) Patent No.: US 7,953,966 B2
(45) Date of Patent: *May 31, 2011

(54) SEMICONDUCTOR DEVICE WITH A POWER DOWN MODE

(75) Inventor: Chang-Ho Do, Ichon-shi (KR)

(73) Assignee: Hynix Semiconductor Inc., Gyeonggi-do (KR)

( * ) Notice: Subject to any disclaimer, the term of this patent is extended or adjusted under 35 U.S.C. 154(b) by 53 days.

This patent is subject to a terminal disclaimer.

(21) Appl. No.: 12/184,909

(22) Filed: Aug. 1, 2008

(65) Prior Publication Data
US 2008/0288800 A1    Nov. 20, 2008

Related U.S. Application Data

(63) Continuation of application No. 11/172,903, filed on Jul. 5, 2005, now Pat. No. 7,418,612.

(30) Foreign Application Priority Data

Mar. 31, 2005  (KR) .................. 10-2005-0027388

(51) Int. Cl.
*G06F 9/00* (2006.01)
*G06F 1/32* (2006.01)
*H03K 19/096* (2006.01)

(52) U.S. Cl. .............. 713/1; 713/320; 713/323; 326/93; 326/96

(58) Field of Classification Search .............. 713/1, 320, 713/323; 326/93, 96
See application file for complete search history.

(56) References Cited

U.S. PATENT DOCUMENTS

| 5,650,741 A | 7/1997 | Nakamura et al. |
| 6,034,563 A | 3/2000 | Mashiko |
| 6,088,290 A | 7/2000 | Ohtake et al. |
| 6,094,039 A * | 7/2000 | Farrenkopf .................. 323/283 |
| 6,137,743 A | 10/2000 | Kim |
| 6,329,874 B1 | 12/2001 | Ye et al. |

(Continued)

FOREIGN PATENT DOCUMENTS

CN          1484368          3/2004

(Continued)

OTHER PUBLICATIONS

Chinese Patent Publication issued from the Chinese Intellectual Property Office on Jan. 21, 2009.

*Primary Examiner* — Vincent T Tran
(74) *Attorney, Agent, or Firm* — IP & T Group LLP

(57) ABSTRACT

The semiconductor device with the power down mode includes a power down detecting block for generating a power down mode signal by detecting if the power down mode is activated, a power source control block for producing a power control signal whose ratio of an enable period to a disable period is determined by the power down mode signal, a current saving block whose driving current requirement is reduced in the power down mode, a power switching block for controlling the power supply to the current saving block in response to the power control signal, and a current non-saving block whose driving current requirement in the power down mode is identical to that in a normal operation mode. The semiconductor device can prevent the current consumption due to off-leakage components and static current components generated at internal analog circuits in the power down mode.

18 Claims, 6 Drawing Sheets

U.S. PATENT DOCUMENTS

| | | | |
|---|---|---|---|
| 6,501,300 B2 * | 12/2002 | Hatae | 326/93 |
| 6,518,826 B2 | 2/2003 | Zhang | |
| 6,586,963 B2 | 7/2003 | Choi et al. | |
| 6,597,204 B2 * | 7/2003 | Imamura | 327/20 |
| 6,765,433 B1 | 7/2004 | Kao | |
| 6,850,453 B2 | 2/2005 | Park | |
| 7,023,757 B2 | 4/2006 | Watanabe et al. | |
| 7,418,612 B2 * | 8/2008 | Do | 713/323 |
| 2003/0149902 A1 | 8/2003 | Silla et al. | |
| 2004/0000946 A1 | 1/2004 | Mitsui | |
| 2004/0001386 A1 | 1/2004 | Park | |
| 2004/0143769 A1 | 7/2004 | Deng et al. | |
| 2005/0097377 A1 * | 5/2005 | Chou | 713/320 |
| 2005/0122820 A1 | 6/2005 | Choi et al. | |

FOREIGN PATENT DOCUMENTS

| | | |
|---|---|---|
| CN | 1574999 | 2/2005 |

* cited by examiner

SEMICONDUCTOR DEVICE WITH A POWER DOWN MODE

RELATED APPLICATIONS

This application is a Continuation of U.S. application Ser. No. 11/172,903, filed Jul. 5, 2005, now U.S. Pat. No. 7,418, 612 claiming priority of Korean Patent Application No. 10-2005-0027388, filed Mar. 31, 2005, the entire contents of each of which are hereby incorporated by reference.

FIELD OF THE INVENTION

The present invention relates to a semiconductor device; particularly to a semiconductor device with a power down mode to save current consumed therein.

BACKGROUND OF THE INVENTION

In case of memory devices used in a mobile era such as a mobile phone, a personal digital assistant (PDA) and so on, it is emerging as a major issue to save power consumed therein. Therefore, a dynamic random access memory (DRAM) used in the mobile era employs a power down mode in which internal power consumption is reduced to a lower one than a certain level in response to a signal inputted through a CKE pin.

FIG. 1 shows a block diagram of a semiconductor device with a conventional power down mode.

In the conventional power down mode using a CKE pin, internal circuits of the semiconductor device are designed not to receive any signals except a signal from the CKE pin when the signal is inputted through the CKE pin with a low state and, as a result, the semiconductor device can reduce its current consumption by controlling the operation of its internal circuits.

However, there is a problem of inducing a substantial amount of current consumption in the conventional semiconductor device in a state of the circuits being inactivated by off-leakage components that are generated as threshold voltages of MOS transistors constructing the semiconductor device are lowered, and static current components produced at analog circuits such as an internal voltage generator.

SUMMARY OF THE INVENTION

It is, therefore, a primary object of the present invention to provide a semiconductor device with a power down mode, capable of sufficiently reducing current consumption in a power saving mode.

Another object of the present invention is to provide a semiconductor device with a power down mode, capable of precluding current consumption from being induced by off-leakage components in a power saving mode.

Further another object of the present invention is to provide a semiconductor device with a power down mode, capable of preventing current consumption from being induced by static current components generated at internal analog circuits in a power saving mode.

In accordance with one embodiment of the present invention, there is provided a power down mode supporting circuit including a power down detecting block for generating a power down mode signal by detecting if the power down mode is activated, a power source control block for producing a power control signal whose ratio of an enable period to a disable period is determined by the power down mode signal, and a power switching block for controlling the power supply to certain internal blocks in a semiconductor device in response to the power control signal.

In accordance with another embodiment of the present invention, there is provided a semiconductor device with a power down mode, which includes a power down detecting block for generating a power down mode signal by detecting if the power down mode is activated, a power source control block for producing a power control signal whose ratio of an enable period to a disable period is determined by the power down mode signal, a current saving block whose driving current requirement is reduced in the power down mode, and a power switching block for controlling the power supply to the current saving block in response to the power control signal.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE PREFERRED EMBODIMENTS

Hereinafter, with reference to the drawings, the preferred embodiment of the present invention will be explained in detail.

Figure 1:
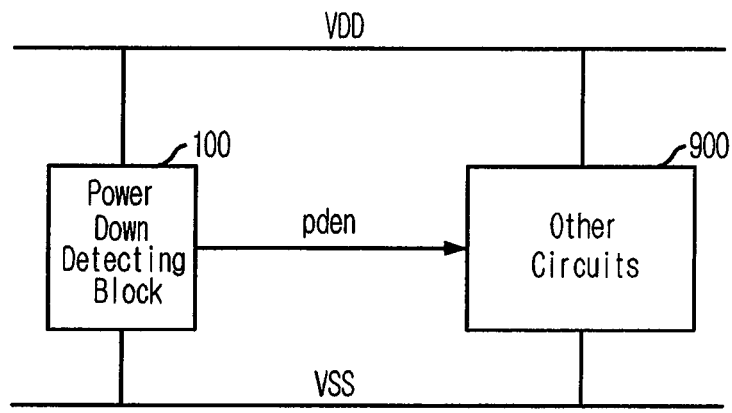
FIG. 1 shows a block diagram of a semiconductor device with a conventional power down mode.
Figure 2:
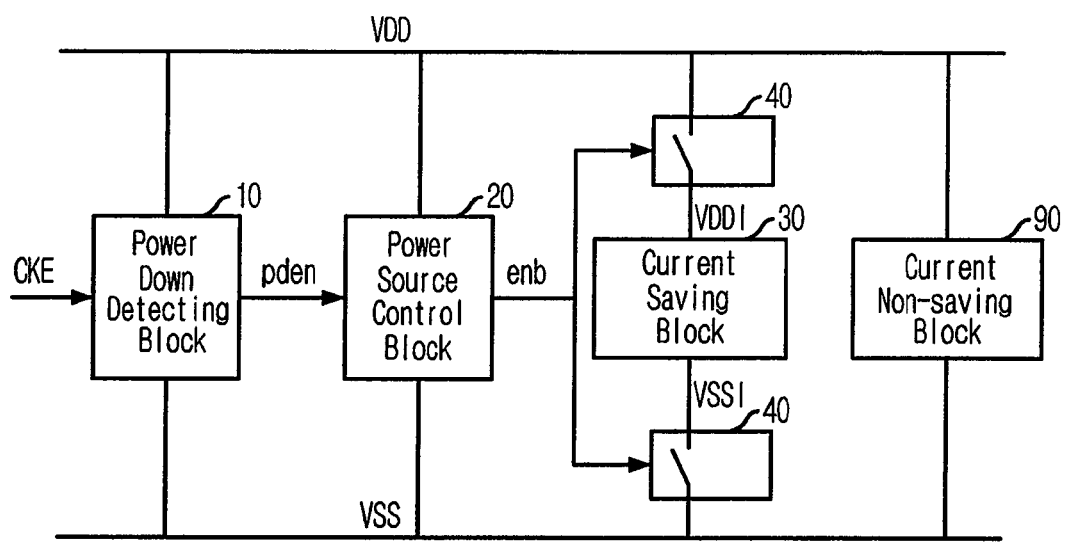
FIG. 2 provides a block diagram of a semiconductor device with a power down mode in accordance with one embodiment of the present invention.

Referring to FIG. 2, there is shown a semiconductor device having a power down mode in accordance with one embodiment of the present invention.

The inventive semiconductor device includes a power down mode supporting circuit, a current saving block 30 whose current consumption is required to be reduced in the power down mode, and a current non-saving block 90 whose current consumption is not required to be reduced in the power down mode.

The power down mode supporting circuit contains a power down detecting block 10 for generating a power down mode signal pden by judging the power down mode, a power source control block 20 for producing a power control signal enb whose ratio of an enable period to a disable period is decided by the power down mode signal pden, and a power switching block 40 for controlling the power supply to the current saving block 30 in response to the power control signal enb.

In the event of a low power DRAM, the DRAM is expected to operate in a power down mode as a rule when a signal having a low state is inputted therein through a CKE pin.

The power down detecting block 10 detects the power down mode by receiving a signal CKE from the CKE pin and generates the power down signal pden to report the activation of the power down mode to the internal circuits of the semiconductor device.

The power source control block 20 produces the power control signal enb having a certain clock form when detecting the power down mode from the power down signal pden coupled thereto. The power control signal enb maintains a state for turning on the power switching block 40 in a normal operation mode.

Herein, the power switching bock 40 simply performs a switching operation for connecting a power supply voltage terminal VDD and a ground voltage terminal VSS to the current saving block 30 under the control signal enb. However, it can have a structure for executing a more accurate switching and a voltage level shifting of a switching device.

The current saving block 30 is inactivated in the power down mode and has internal circuits requiring minimum current supply to maintain their internal state although the required current is not much compared to that in the normal operation mode. For instance, the DRAM has a read/write operation supporting circuit, an analog comparison circuit and so on, as the current saving circuit.

The current non-saving block 90 consists of circuits requiring current supply in the power down mode as much as that in the normal operation mode.

Figure 3:
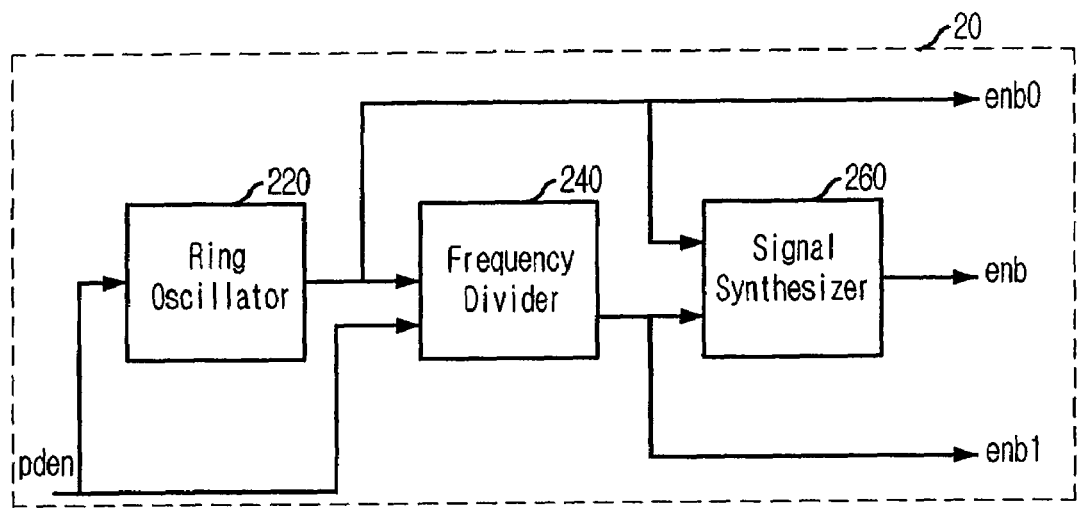
FIG. 3 represents a detailed block diagram of a power source control block in FIG. 2.

With reference to FIG. 3, there is represented a detailed block diagram of the power source control block 20 in FIG. 2 in accordance with an embodiment of the present invention.

The power source control block 20 contains a ring oscillator 220 for generating a reference pulse enb0 to be used in producing the power control signal enb, a frequency divider 240 for frequency-dividing the reference pulse enb0 to produce a divided pulse enb1, and a signal synthesizer 260 for performing a logical operation of the reference pulse enb0 and the divided pulse enb1 to thereby generate the power control signal enb.

Figure 4A:
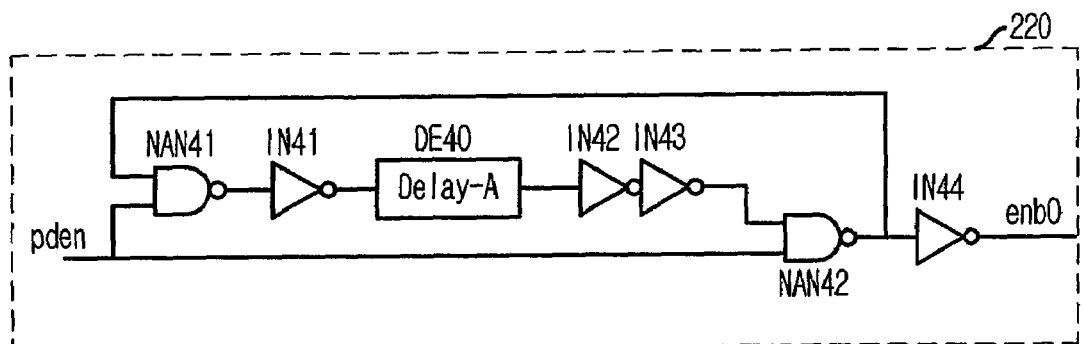
FIG. 4A describes a detailed circuit diagram of a ring oscillator in FIG. 3.

FIG. 4A describes a detailed circuit diagram of the ring oscillator 220 in FIG. 3.

The ring oscillator 220 has inverters IN41 to IN44, a delay unit DE40, and NAND gates NAN41 and NAN42 for controlling an oscillating operation in response to the power down signal pden.

The NAND gates NAN41 and NAN42 always generate outputs having a high vale when the power down signal pden has a low state. The high value outputted from the NAND gate NAN42 is inverted by the inverter IN44 and, therefore, the ring oscillator 220 always outputs the reference pulse enb0 having a low state when the device is not in the power down mode. On the other hand, when the power down signal pden has a high state, since the NAND gates NAN41 and NAN42 operate like inverters, the circuit in FIG. 4A operates as a ring oscillator consisting of 5 inverters and one delay unit. As a result, the ring oscillator 220 outputs the reference pulse enb0 oscillated with a set frequency.

Figure 4B:
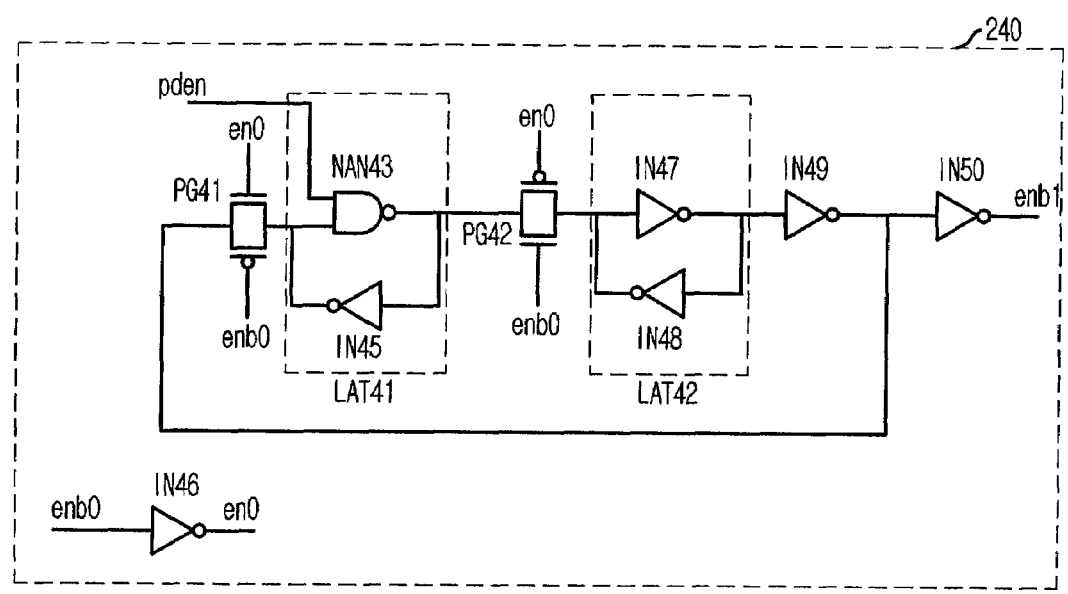
FIG. 4B presents a detailed circuit diagram of a frequency divider in FIG. 3.

FIG. 4B presents a detailed circuit diagram of the frequency divider 240 in FIG. 3, which is a 2 step divider containing 2 pass gates PG41 and PG42 an 2 latches LAT41 and LAT42.

The frequency divider 240 has the first and the second pass gates PG41 and PG42 for receiving oscillated clocks enb0 and en0 outputted from the ring oscillator 220 as their control signals, wherein the oscillated clock en0 is made by inverting the reference pulse enb0, the first latch LAT41 for latching a signal provided from the first pass gate PG41 and outputting an inverted signal of the signal from the first pass gate PG41 to the second pass gate PG42, the second latch LAT42 for latching a signal coupled from the second pass gate PG42, and a feedback inverter IN49 for inverting an output signal of the second latch LAT42 and providing an inverted signal to the first pass gate PG41.

Among inverters constructing the first and the second latches LAT41 and LAT42, one inverter is changed to a NAND gate NAN43 as shown in FIG. 4B so as to receive the power down signal pden and, as a result, the frequency divider 240 is inactivated when the power down signal pden has a low state.

In the above embodiment, although the frequency divider 240 is formed with one 2-step divider, it can be implemented with a plurality of frequency dividers having more than 2 frequency dividing steps.

Figure 4C:
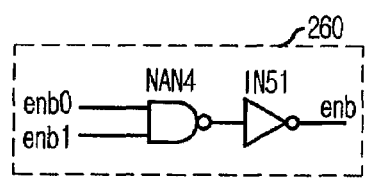
FIG. 4C shows a detailed circuit diagram of a signal synthesizer in FIG. 3.

The signal synthesizer 260 described in FIG. 4C performs an AND operation by using the oscillated clock enb0 and the divided clock enb1 to thereby generate the power control signal enb.

Figure 5:
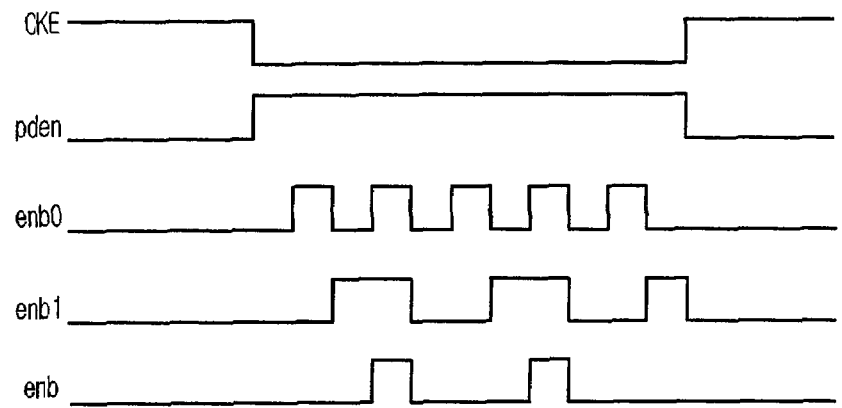
FIG. 5 provides a waveform diagram of signals used in the power source control block.

FIG. 5 shows signals generated at the power source control block 20 illustrated in FIGS. 3, and 4A to 4C.

As described in FIG. 5, the high period of the power down mode signal pden having an inverted form of the signal inputted through the CKE pin is used for the power down mode.

During the power down mode period, the ring oscillator 220 generates the oscillated clock enb0 and the frequency divider 240 produces the divided clock enb1 by dividing the oscillated clock enb0.

The length of the high period of the power control signal enb, which is made by logical operating the oscillated clock enb0 and the divided clock enb1, is the same of that of the oscillated clock enb0 and its frequency is identical to that of the divided clock enb1.

Figure 6:
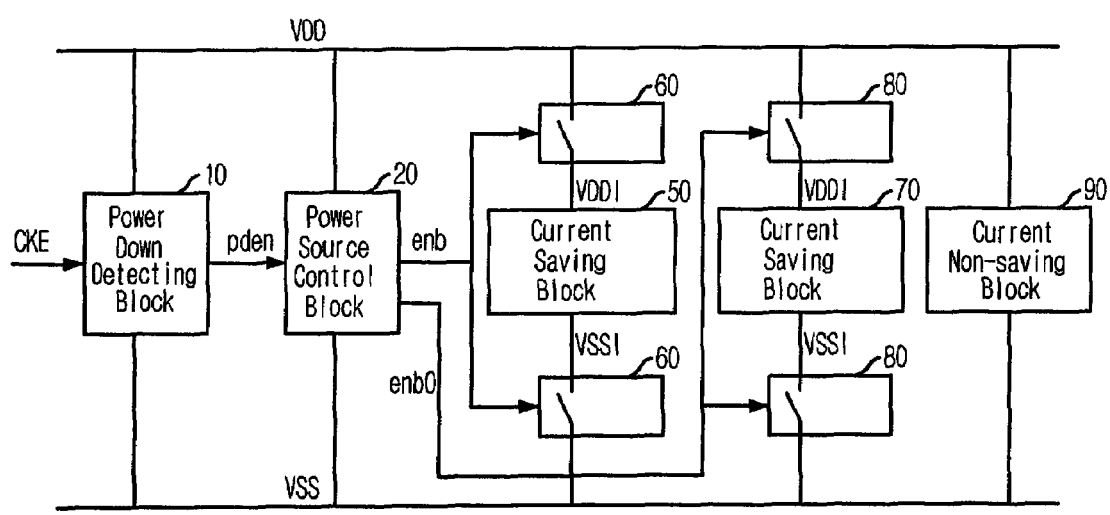
FIG. 6 depicts a block diagram of a semiconductor device with a power down mode in accordance with another embodiment of the present invention.

FIG. 6 depicts a block diagram of a semiconductor device having a power down mode in accordance with another embodiment of the present invention.

The inventive semiconductor device includes N number of current saving blocks whose required driving currents are different from each other and N number of power switching blocks each of which switches a corresponding current saving block, N being an integer, e.g., 2 in FIG. 6.

Since the current saving blocks 50 and 70 require difference power strength in the power down mode, the ratio of an enable period to a disable period of a power control signal for switching the power switching block 60 is different from that of a power control signal for switching the other power switching block 80.

In the semiconductor device described in FIG. 6, the oscillated clock enb0 among the signals generated at the power source control block 20 is provided to the power switching block 80 corresponding to the current saving block 70 requiring less power compared to the current saving block 50. Meanwhile, the oscillated clock enb is coupled to the power switching block 60 corresponding to the current saving block 50 requiring larger power than that for the current saving block 70.

Figure 7:
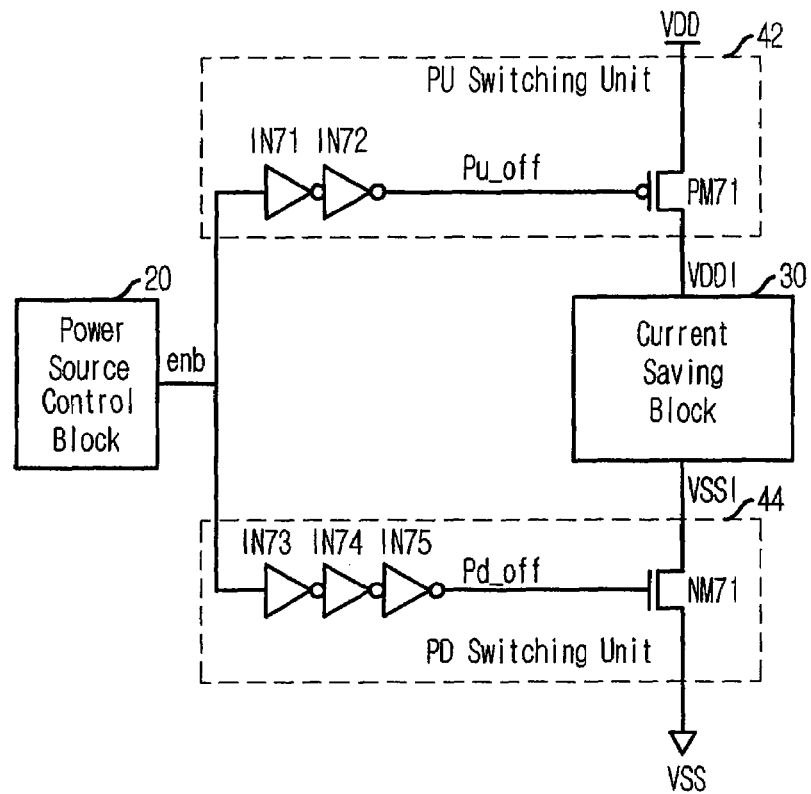
FIG. 7 describes a circuit diagram of a power switching block in FIG. 2 in accordance with an embodiment of the present invention.

FIG. 7 describes the power switching block 40 in FIG. 2 in accordance with an embodiment of the present invention.

The power switching block 40 contains a power-up (PU) switching unit 42 for controlling the connection between the current saving block 30 and a power supply voltage terminal VDD and a power-down (PD) switching unit 44 for controlling the connection between the current saving block 30 and a ground voltage terminal VSS.

The PU switching unit 42 has a switching PMOS transistor PM71 and an inverter array IN71 and IN72 for making the power control signal enb closer to a square wave. In the meantime, the PD switching unit 44 has a switching NMOS transistor NM71 and an inverter array IN73 to IN75 for inverting and making the power control signal enb closer to a square wave.

Figure 8A:
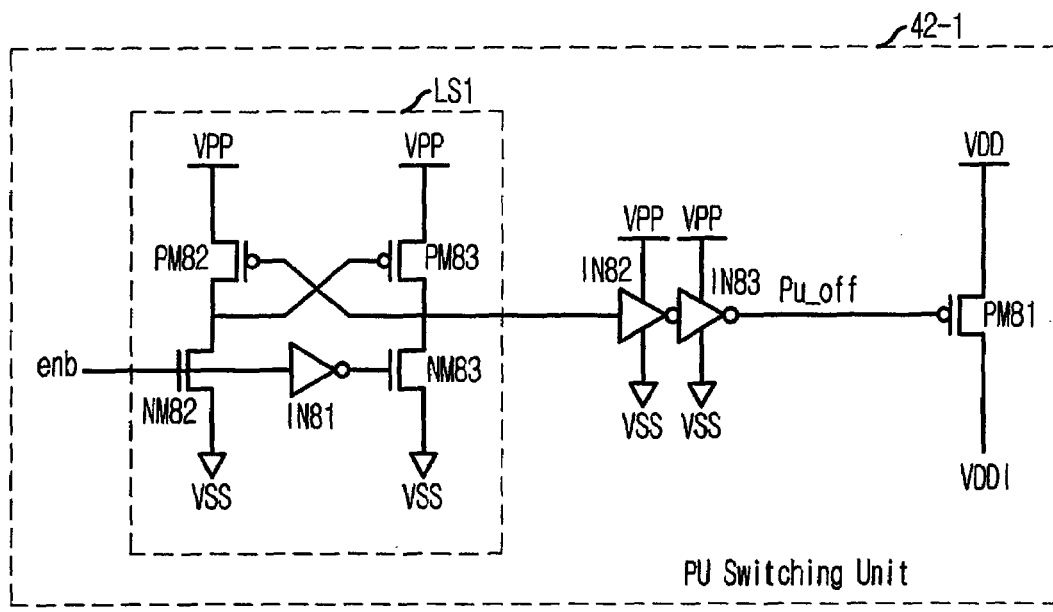
FIG. 8A is a circuit diagram of a power-up switching unit of the power switching block in FIG. 2 in accordance with another embodiment of the present invention.

FIG. 8A shows a power-up switching unit of the power switching block 40 in FIG. 2 in accordance with another embodiment of the present invention.

In FIG. 8A, an up switch is formed with a PMOS transistor PM81 to deliver a power supply voltage VDD into the current saving block 30 and, therefore, it is more preferable that a higher level voltage than the power supply voltage VDD is coupled to a gate of the PMOS transistor PM81 for more definitely blocking the VDD propagation through the transistor PM81 than when the transistor PM81 is turned off. As described in FIG. 8A, in order to provide the up switch with a boosted voltage VPP higher than the supply voltage VDD as a turn-off signal of the up switch, there are employed inverters IN82 and IN83 toggling between a boosted voltage level VPP and a ground voltage level VSS.

A level shifter LS1 is to convert the power control signal enb which transits between the power supply voltage VDD and the ground voltage VSS to an up-switching signal Pu_off which transits between the boosted voltage VPP and the ground voltage VSS. The level shifter LS1 can generate an output signal transiting between the boosted voltage VPP and the ground voltage VSS since diagonally located MOS transistors are turned on in response to the power control signal enb and the operation of an internal inverter IN81.

Figure 8B:
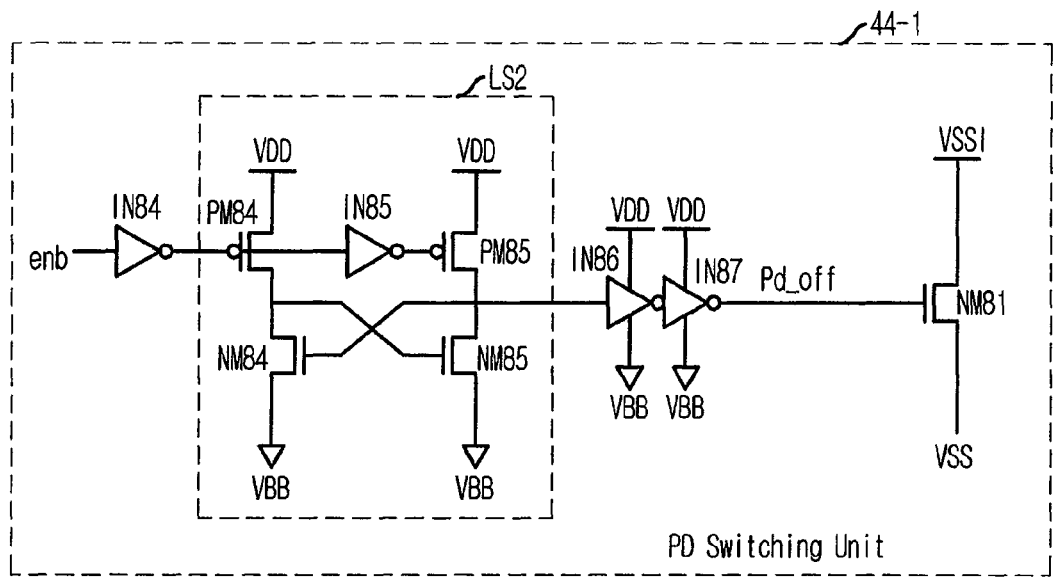
FIG. 8B represents a circuit diagram of a power-down switching unit of the power switching block in FIG. 2 in accordance with another embodiment of the present invention.

FIG. 8B represents a power-down switching unit of the power switching block 40 in FIG. 2 in accordance with another embodiment of the present invention.

In FIG. 8B, a down switch is formed with an NMOS transistor NM81 to deliver the ground voltage VSS into the current saving block 30 and, therefore, it is more preferable that a lower level voltage than the ground voltage VSS is fed to a gate of the NMOS transistor NM81 for more definitely blocking the VSS propagation through the transistor NM81 than when the transistor NM81 is turned off. As illustrated in FIG. 8B, in order to provide the down switch with a base ground voltage VBB lower than the ground voltage VSS as a turn-off signal of the down switch, there are contained inverters IN86 and IN87 toggling between a supply voltage level VDD and a base ground voltage level VBB.

A level shifter LS2 is to convert the power control signal enb that transits between the power supply voltage VDD and the ground voltage VSS to a down-switching signal Pd_off, which transits between the supply voltage VDD and the base ground voltage VBB. The level shifter LS2 can produce an output signal transiting between the supply voltage VDD and the base ground voltage VBB since diagonally located MOS transistors are turned on in response to the power control signal enb and the operation of an internal inverter IN85.

Figure 8C:
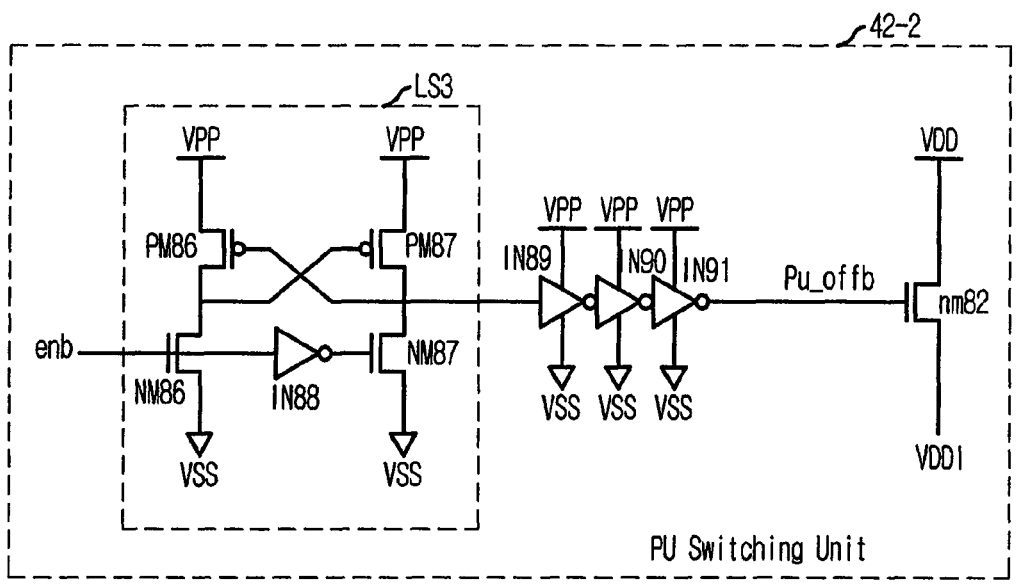
FIG. 8C shows a circuit diagram of a power-down switching unit of the power switching block in FIG. 2 in accordance with further another embodiment of the present invention.

FIG. 8C shows a power-down switching unit of the power switching block 40 in FIG. 2 in accordance with further another embodiment of the present invention. An up switch is formed with an NMOS transistor NM82 to deliver the power supply voltage VDD to the current saving block 30. As depicted in FIG. 8C, an up-switching signal Pu_offb has a turn-on voltage of the boosted voltage level VPP and a turn-off voltage of the ground voltage level VSS. As a result, the up switch NM82 can be definitely turned on and turned off.

A method for performing a power down mode executed in the inventive semiconductor device having the structure described in the above includes the steps of detecting the power down mode in response to a power down instruction (S120), generating the power control signal having a pulse form whose ratio of an enable period to a disable period is determined by the power down mode (S140), and performing the switching operation for supplying the supply voltage to the current saving block therein under the control of the power control signal (S160).

In the step S120, the power down detecting block 10 detects the power down instruction (CKE) and then generates the power down signal pden to other circuit blocks in the semiconductor device so as to report the power down mode to them.

In the step S140, the power source control block 20 produces the power control signal enb illustrated in FIG. 5.

Meanwhile, the step S160 is performed at the power-up switching unit PU_SW1 for switching the connection between the power supply voltage terminal VDD and the current saving block 50 and the power-down switching unit PD_SW1 for switching the connection between the ground voltage terminal VSS and the current saving block 50. In FIG. 6, the step S160 is executed at the several power switching blocks 60 and 80. At this time, the ratio of the enable period to the disable period of the power control signal enb is different from that of the power control signal enb0, wherein the power control signals enb and enb0 are provided to the power switching blocks 60 and 80, respectively.

As shown above, the inventive semiconductor device can preclude the current consumption induced by the off-leakage components in the power down mode (power saving mode).

The inventive semiconductor device can also prevent the current consumption due to the static current component generated at internal analog circuits in the power saving mode.

Furthermore, the inventive semiconductor device can extremely reduce the current consumption by providing its other internal circuits with their optimized power required in the power down mode.

The present application contains subject matter related to Korean patent application No. 2005-27388, filed in the Korean Patent Office on Mar. 31, 2005, the entire contents of which being incorporated herein by reference.

While the present invention has been described with respect to the particular embodiments, it will be apparent to those skilled in the art that various changes and modifications may be made without departing from the spirit and scope of the invention as defined in the following claims.

What is claimed is:
1. A semiconductor device with a power down mode, comprising:
   an oscillator for generating a reference pulse in response to a power down mode signal activated in a power down mode;
   a frequency divider for generating a divided pulse by frequency-dividing the reference pulse; and a signal synthesizer for generating a power control signal by performing a logic operation for the reference pulse and the divided pulse.

2. The semiconductor device of claim 1, further comprising a current non-saving block whose driving current requirement in the power down mode is identical to that in a normal operation mode.

3. The semiconductor device of claim 1, wherein the oscillator has an odd number of inverters and an oscillation trigger for controlling an oscillating operation in response to the power down signal.

4. The semiconductor device of claim 1, wherein the frequency divider includes:
a first and a second pass gate for receiving oscillated clocks outputted from the oscillator as control signals;
a first latch for latching a signal inputted from the first pass gate and providing the second pass gate with an inverted signal of the latched signal;
a second latch for latching a signal supplied from the second pass gate; and
a feedback inverter for inverting a signal outputted from the second latch and delivering an inverted signal to the first pass gate.

5. The semiconductor device of claim 1, wherein the signal synthesizer is an AND gate for performing an AND operation of the reference pulse and the divided pulse to output an AND operational result as the power control signal.

6. The semiconductor device of claim 1, further comprising:
a current saving block whose driving current requirement is reduced in the power down mode; and
a power switching block for switching a power supply to the current saving block in response to the power control signal.

7. The semiconductor device of claim 6, wherein the power switching block includes:
a power-up switching unit for controlling the connection between the current saving block and a power supply voltage terminal; and
a power-down switching unit for controlling the connection between the current saving block and a ground voltage terminal.

8. The semiconductor device of claim 7, wherein the power-up switching unit has a switching MOS transistor and an inverter array for receiving the power control signal and outputting a signal whose logic state is identical to that of the power control signal, and the power-down switching unit has a switching MOS transistor and an inverter array for receiving the power control signal and outputting a signal having an inverted logic state of the power control signal.

9. The semiconductor device of claim 8, wherein the inverter array of the power-up switching unit has inverters toggling between a boosted voltage level and a ground voltage level to provide a boosted voltage to a gate of the switching MOS transistor as a turn-off signal, a level of the boosted voltage being higher than that of a supply voltage of the power supply voltage terminal, and the inverter array of the power-down switching unit has inverters toggling between the supply voltage of the power supply voltage terminal and a base ground voltage level to supply a base ground voltage to a gate of the switching MOS transistor as a turn-off signal, a level of the base ground voltage being lower than that of the ground voltage.

10. The semiconductor device of claim 8, wherein the inverter array of the power-up switching unit has inverters toggling between a boosted voltage level and a ground voltage level to provide a boosted voltage to a gate of the switching MOS transistor as a turn-on signal, a level of the boosted voltage being higher than that of a supply voltage of the power supply voltage terminal, and the inverter array of the power-down switching unit has inverters toggling between the supply voltage of the power supply voltage terminal and a base ground voltage level to supply a base ground voltage to a gate of the switching MOS transistor as a turn-off signal, a level of the base ground voltage being lower than that of the ground voltage.

11. A semiconductor device with a power down mode, comprising:
a power down detecting block for generating a power down mode signal by detecting that the power down mode is activated; and
a power source control block for generating N number of power control signals during the power down mode in response to the power down mode signal, N being an integer,
wherein the power source control block includes
an oscillator for generating a reference pulse in response to the power down mode signal activated in the power down mode;
a frequency divider for generating a divided pulse by frequency-dividing the reference pulse; and
a signal synthesizer for generating the power control signal by performing a logic operation for the reference pulse and the divided pulse.

12. The semiconductor device of claim 11, further comprising:
N number of current saving blocks, each having a driving current requirement that is reduced differently from each other in the power down mode; and
N number of power switching blocks for controlling the power to the respective current saving blocks in response to the respective power control signals.

13. The semiconductor device of claim 12, further comprising a current non-saving block whose driving current requirement in the power down mode is identical to that in a normal operation mode.

14. The semiconductor device of claims 12, wherein each of the power switching blocks includes:
a power-up switching unit for controlling the connection between a corresponding current saving block and a power supply voltage terminal; and
a power-down switching unit for controlling the connection between said corresponding current saving block and a ground voltage terminal.

15. The semiconductor device of claim 14, wherein the power-up switching unit has a switching MOS transistor and an inverter array for receiving the power control signal and outputting a signal whose logic state is identical to that of the power control signal, and the power-down switching unit has a switching MOS transistor and an inverter array for receiving the power control signal and outputting a signal having an inverted logic state of the power control signal.

16. The semiconductor device of claim 15, wherein the inverter array of the power-up switching unit has inverters toggling between a boosted voltage level and a ground voltage level to provide a boosted voltage to a gate of the switching MOS transistor as a turn-off signal, a level of the boosted voltage being higher than that of a supply voltage of the power supply voltage terminal, and the inverter array of the power-down switching unit has inverters toggling between the supply voltage of the power supply voltage terminal and a base ground voltage level to supply a base ground voltage to a gate of the switching MOS transistor as a turn-off signal, a level of the base ground voltage being lower than that of the ground voltage.

17. A power down mode supporting circuit, comprising:
a power down detecting block for generating a power down mode signal by detecting that the power down mode is activated;
a power source control block for generating a power control signal during the power down mode in response to the power down mode signal; and
a power switching block for switching a power supply to predetermined internal blocks of a semiconductor device in response to the power control signal,
wherein the power source control block includes
an oscillator for generating a reference pulse in response to the power down mode signal activated in the power down mode;
a frequency divider for generating a divided pulse by frequency-dividing the reference pulse; and
a signal synthesizer for generating the power control signal by performing a logic operation for the reference pulse and the divided pulse.

18. The semiconductor device of claim 17, wherein the power switching block includes:
a power-up switching unit for switching the connection between each of the internal blocks and a power supply voltage terminal; and
a power-down switching unit for switching the connection between said each of the internal blocks and a ground voltage terminal.

* * * * *